(12) United States Patent
Mo et al.

(10) Patent No.: US 6,693,909 B1
(45) Date of Patent: Feb. 17, 2004

(54) METHOD AND SYSTEM FOR TRANSPORTING TRAFFIC IN A PACKET-SWITCHED NETWORK

(75) Inventors: Li Mo, Plano, TX (US); Edward T. Sullivan, Highland Village, TX (US); Carl A. DeWilde, Richardson, TX (US); Wayne R. Sankey, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 78 days.

(21) Appl. No.: 09/588,636

(22) Filed: Jun. 6, 2000

Related U.S. Application Data
(60) Provisional application No. 60/202,190, filed on May 5, 2000.

(51) Int. Cl.[7] ............................ H04L 12/28; H04J 3/04; H04J 3/02

(52) U.S. Cl. ................. 370/392; 370/401; 370/535; 370/539

(58) Field of Search ................ 370/230, 235, 370/237, 230.1, 351, 352, 355, 392, 395.1, 397, 395.21, 395.43, 401, 466, 412, 413, 415, 417, 468, 477, 414, 416, 418, 535, 537, 541, 539; 359/118

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,461,624 A | 10/1995 | Mazzola | 370/85.13 |
| 5,590,133 A | 12/1996 | Billstrom et al. | 370/349 |
| 5,771,370 A | 6/1998 | Klein | 395/500 |
| 5,781,534 A | 7/1998 | Perlman et al. | 370/248 |
| 5,818,842 A * | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |
| 6,028,842 A | 2/2000 | Chapman et al. | 370/235 |
| 6,058,113 A | 5/2000 | Chang | 370/390 |
| 6,075,767 A | 6/2000 | Sakamoto et al. | 370/228 |
| 6,205,158 B1 * | 3/2001 | Martin et al. | 370/541 |

(List continued on next page.)

FOREIGN PATENT DOCUMENTS

| | | | |
|---|---|---|---|
| EP | 0 512 495 A2 | 11/1992 | H04L/12/56 |
| EP | 0 849 970 A2 | 6/1998 | H04Q/11/04 |
| EP | 0959 641 A1 | 11/1999 | H04Q/11/04 |
| WO | WO 97/40610 | 10/1997 | H04L/29/06 |
| WO | WO 98/00954 | 1/1998 | H04L/29/06 |
| WO | WO 99/11090 | 3/1999 | H04Q/11/04 |
| WO | WO 99/66675 | 12/1999 | H04L/12/46 |
| WO | WO 00/10357 | 2/2000 | H04Q/7/38 |
| WO | WO 00/21254 | 4/2000 | H04L/12/56 |
| WO | WO 00/24164 | 4/2000 | H04L/12/56 |

OTHER PUBLICATIONS

Friz J: "Bullet Proofing ATM: Part I," Byte, McGraw–Hill Inc. St. Peterborough, US, vol. 22, No. 6, Jun. 1, 1997, pp. 59–60, XP000691556, ISSN: 0360–5280, p. 60.

(List continued on next page.)

*Primary Examiner*—Huy D. Vu
*Assistant Examiner*—Duc Ho
(74) *Attorney, Agent, or Firm*—Baker Botts L.L.P.

(57) ABSTRACT

A method and system for transporting traffic in a packet-switched network segments high priority pass-through traffic from low priority pass-through traffic. The high priority pass-through traffic is transmitted on an egress link preferentially over the low priority pass-through traffic and ingress high priority local traffic. The ingress high priority local traffic is transmitted on the egress link preferentially over the low priority pass-through traffic.

34 Claims, 6 Drawing Sheets

U.S. PATENT DOCUMENTS

| | | | |
|---|---|---|---|
| 6,317,426 B1 | 11/2001 | Afanador et al. | 370/352 |
| 6,331,905 B1 | 12/2001 | Ellinas et al. | 359/110 |
| 6,353,593 B1 | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 | 4/2002 | Ballintine et al. | 370/216 |
| 6,515,966 B1 | 2/2003 | Bardalai et al. | 370/236 |
| 2001/0025310 A1 | 9/2001 | Krishnamurthy et al. | 709/223 |

OTHER PUBLICATIONS

Sun. H. et al.: "Supporting IP on the ATM networks: an overview," Computer Communications, Elsevier Science Publishers BV, Amsterdam, NL, vol. 21, No. 11, Aug. 10, 1998, pp. 1020–1029, XP004138773, ISSN:0140–3664, whole document.

Mysore J. P. et al.: "Performance of transport protocols over a multicasting–based architecture fr Internet host mobility" Communications, 1998. ICC 98. Conference Record. 1998 IEEE International Conference on Atlanta, GA, USA Jun. 7–11, 1998, New York, NY USA, IEEE, US, Jun. 7, 1998, pp. 1817–1823, XP10284635, ISBN:0–7803–4788–9.

Bar–Noy A. et al.: "Topology Distribution Cost Vs. Efficient Routing in Large Networks," Computer Communications Review, Association for Computing Machinery, New York, US, vol. 20, No. 4, Sept. 1, 1990, pp. 242–252, XP000168058; ISSN: 0146–4833, whole document.

International Search Report in International Application No. PCT/US01/13694, dated Mar. 12, 2002, 7 pgs.

International Search Report in International Application No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection–Oriented and Connectionless Transport," ISS '97. World Telecommunications Congress. (Int'l Switching Symposium). Global Network Evolution: Convergence or Collision? Toronto, Sep. 21–26, 1997, ISS World Telecommunications Congress. (International Switching Symposium).

PCT International Search Report No. PCT/US01/13724, dated Nov. 30, 2001, 6 pages.

Birman A et al.: "Support for RSVP–Based Services Over ATM Networks," Communications: The Key to Global Prosperity. Globecom 1996. Global Internet 96 Conference Record. London, Nov. 18–22, 1996, Global Telecommunications Conference (Globecom, New York, IEEE, US, vol. Supp, 18, Nov. 1996 pp. 10–15, XP000741665 ISBN: 0–7803–3337–3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7–11, 1997, Los Alamitos, CA USA, IEEE Comptu. Soc, US Apr. 7, 1997, pp. 222–229, XP010252006, ISBN: 0–8186–7780–5.

Law A M et al: "Simulation Software for Communications Networks: The State of the Art," IEEE Communications Magazine, IEEE Service Center. Piscataway, N.J., US, vol. 32, No. 3, Mar. 1 ,1994, p. 1, col. 2, line 4–p. 2, col. 1, Line 39, p. 4, col. 1, line 3–p. 6, col. 1, paragraph 6; XP 000442186.

International Search Report in International Application No. PCT/US01/14615, dated Apr. 5, 2002, 7 pages.

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages.

PCT Invitation to Pay Additional Fees in International Application No. PCT/US 01/13732, dated Nov. 7, 2001, 4 pages.

Tsong–Ho Wu, "A Passive Protected Self–Healing Mesh Network Architecture and Applications," XP 000446089, IEEE/ACM Transactions on Networking, Feb., 1994, 13 pages.

PCT International Search Report in International Application No. PCT/US 01/13695, dated Oct. 9, 2001, 6 pages.

International Preliminary Examination Report in International Application No. PCT/US01/13732, dated Jul. 12, 2002, 5 pages.

Form PCT/IPEA /416. Notification of Transmittal of International Preliminary Examination Report, with attached Form PCT/IPEA/409, PCT International Preliminary Examination Report (5 pages), for PCT/US01/13694 dated Mar. 19, 2003.

International Preliminary Examination Report in International Application No. PCT/US01/13695, dated Oct. 30, 2002, 4 pages. Oct. 30, 2002.

Kermani, et al., "Virtual Cut–through: A New Computer Communication Switching Technique", Computer Networks, vol. 3, Cover, Table of Contents and pp. 267–285, 1979.

Cidon, et al., "MetaRing –A Full Duplex Ring with Fairness and Spatial Reuse", IEEE Transactions on Communications, vol. 41, Cover and pp. 110–120, Jan. 1993.

Ofek, et al., "METANET: Principles of an Arbitrary Topology LAN", IEEE Transactions on Networking, vol. 3, No. 2, Cover and pp. 169–180, Apr. 1995.

West, "Introduction to Graph Theory", Prentice Hall, ISBN 0–13–227828–6, QA166.W43 1996, 7 page Cover, ISBN page, Table of Contents, and pp. 51–85, 1996.

Hunter, et al., " WASPNET: A Wavelength Switched Packet Network", IEEE Communications Magazine, 2–page cover and pp. 120–129 Mar. 1999.

Hernandez–Valencia, "A Simple Data Link (SDL) Framing Protocol for High–Speed Optical Packet Networks", OIF99.043.0, pp. 1–21, May 4, 1999.

Simpson, "The Point–to–Point Protocol (PPP)", Daydreamer, RFC–1661, 50 pages, Jul. 1994.

Katz, et al., "Traffic Engineering Extensions to OSPF", IETF Draft, draft–katz–yeung–ospf–traffic–01.txt, pp. 1–8, Oct. 1999.

Crawley, et al., "A Framework for Qos Based Routing in the Internet", RFC 2386, 35 pages, Aug. 1998.

Wimer, et al, FORE Systems, Inc., "OSPF Sub–Areas", IETF Draft, draft–wimer–ospf–sub–areas–00.txt, 13 pages, Oct. 1999.

Wimer, et al., FORE Systems, Inc., "Additional OSPF Extensions for Traffic Engineering and Qos Routing", IETF Draft, draft–wimer–ospf–traffic–00.txt, 5 pages Feb. 1999.

Yeung, "OSPF Extensions for Traffic Engineering", IETF Draft, draft–yeung–ospf–traffic–00.txt, 9 pages, Feb. 1999.

Apostolopoulos, et al., "Qos Routing Mechanism and OSPF Extensions", RFC 2676, 47 pages, Aug. 1998.

Smit, et al., "IS–IS Extensions for Traffic Engineering", IETF Draft, draft–ietf–isis–traffic–00.txt, 10 pages, May 1999.

Awduche, et al., UUNET (MCI WorldCom), "Requirements for Traffic Engineering Over MPLS", RFC 2702, 28 pages, Sep. 1999.

Blake, et al., "An Architecture for Differentiated Services", RFC 2475, 34 pages, Dec. 1998.

Braden, et al., "Resource ReSerVation Protocol (RSVP)", Version 1 Functional Specification, RFC 2205, 105 pages, Sep. 1997.

Wroclawski, "Specification of the Controlled–Load Network Element Service", RFC 2211, 18 pages, Sep. 1997.

Shenker, et al., "Specification of Guaranteed Quality of Service", RFC 2212, 19 pages, Sep. 1997.

Reynolds, et al., ISI, "Assigned Numbers", RFC 1700, 215 pages Oct. 1994.

Jacobson, et al., "An Expedited Forwarding PHB", RFC 2598, 11 pages, Jun. 1999.

Heinanen, et al., "Assured Forwarding PHB Group", RFC 2597, 11 pages, Jun. 1999.

Manchester, et al., Bell Laboratories, "IP over SONET", IEEE Communications Magazine, vol. 36, No. 5, cover and pp. 136–142, May 1998.

Heinanen, Telecom Finland "Multi–Protocol Encapsulation over ATM Adaptation Layer 5", RFC 1483, 15 pages, Jul. 1993.

The ATM Forum, Technical Committee, "Private Network–Network Interface Specification Version 1.0", af–p-nni–0055.000, cover, introduction, acknowledgements and table of contents (18 pages) and 366 pages of text, Mar. 1996.

Callon, Digital Equipment Corporation, "Use of OSI IS–IS for Routing in TCP/IP and Dual Environments", RFC 1195, 80 pages, Dec. 1990.

Moy, Ascend Communications "OSPF Version 2", RFC 2328, 204 pages, Apr. 1998.

Malkin, Bay Networks, "RIP Version 2", RFC 2453, 37 pages, Nov. 1998.

Rekhter, et al., "A Border Gateway Protocol 4 (BGP–4)", RFC 1771, 54 pages, Mar. 1995.

Goguen, et al., "RSVP Label Allocation for Backup Tunnels", draft–swallow–rsvp–bypass–label–00.txt, IETF Document, 10 pages, Oct. 1999.

Callon, et al., "A Framework for MPLS", draft–ietf–mpls–framework–05.txt, IETF document, 69 pages, Sep. 1999.

Rosen, et al., "Multiprotocol Label Switching Architecture", draft–ietf–mpls–arch–06.txt, IETF Document, 62 pages, Feb. 1999.

Rosen, et al., "MPLS Label Stack Encoding", IETF document, draft–ieft–mpls–label–encaps–07.txt, 22 pages, Sep. 1999.

Andersson, et al., "LDP Specification" , IETF document, draft–ietf–mpls–Idp–06.txt, 124 pages, Oct. 1999.

Jamoussi, Nortel Networks Corp., "Constraint–Based LSP Setup Using LDP", draft–ietf–mpls–cr–Idp–03.txt, IETF Document, pp. 1–39, Sep. 1999.

Guerin, "Qos Routing in Networks with Inaccurate Information: Theory and Algorithms", IEEE/ACM Transactions on Networking, vol. 7, No. 3, cover and pp. 350–364, Jun. 1999.

Parekh, et al., "A Generalized Processor Sharing Approach to Flow Control in Integrated Services Networks:The Single Node Case", IEEE Transactions on Networking, vol. 1, No. 3, cover and pp. 344–357, Jun. 1993.

Parekh, et al., "A Generalized Processor Sharing Approach to Flow Control in Integrated Services Networks:The Multiple Node Case", IEEE Transactions on Networking, vol. 2, No. 2, cover and pp. 137–150, Apr.1994.

Golestani, "A Self–Clocked Fair Queuing Scheme for Broadband Applications", Proceedings of IEEE Infocom '94, Toronto, Ontario, Canada, cover and pp. 636–646, Jun. 1994.

Zhang, "Virtual Clock: A New Traffic Control Algorithm for Packet Switching Networks", ACM SIGCOMM Computer Communication Reviews, vol. 20, No. 4, pp. 19–29, Sep. 1990.

Ferrari, et al., "A Scheme for Real–Time Channel Establishment in Wide–Area Networks", IEEE Journal on Selected Areas in Communications, vol. 8, No. 3, cover and pp. 368–379, Apr. 1990.

Wrege, et al., "A Near–Optimal Packet Scheduler for QoS Networks", Proceedings of IEEE Infocom '97, Kobe, Japan, cover and pp. 576–583, Apr. 7–12, 1997.

Golestani, "A Stop–and–Go Queuing Framework for Congestion Management", ACM SIGCOMM Computer Communications Review, vol. 20, No. 4., pp. 8–18, Sep. 1990.

Kalmanek, et al., "Rate Controlled Servers for Very High–Speed Networks", Proceedings of IEEE Globecom '90, San Diego, CA, Conference Record vol. 1 of 3, cover and pp. 300.3.1–300.3.9, Dec. 2–5, 1990.

Sriram, K., "Methodologies for Bandwidth Allocation, Transmission, Scheduling and Congestion Avoidance in Broadband ATM Networks", Proceedings of IEEE Globecom, '92, Orlando, FL, Conference Record vol. 3 of 3, cover and pp. 1545–1551, Dec. 6–9, 1992.

Jacobson, et al., "Random Early Detection Gateways for Congestion Avoidance", ACM/IEEE Transactions on Networking, vol. 1, No. 4, cover and pp. 397–413, Aug. 1993.

Braden, et al., "Recommendations on Queue Management and Congestion Avoidance in the Internet", RFC 2309, 16 pages, Apr. 1998.

Jacobson, "Notes on Using RED for Queue Management and Congestion Avoidance", Network Research Group, Berkeley National Laboratory, Berkeley, CA, NANOG 13, Dearborn, MI, cover and 15 pages, Jun. 8, 1998.

May, et al., "Analytic Evaluation of RED Performance", pp. 1–10, Jun. 1998.

May, et al., "Reasons Not To Deploy RED", pp. 1–5, May 1999.

Lakshman, et al., "SRED: Stabilized RED", pp. 1–10, Mar. 1999.

Feng, et al., "BLUE: A New Class of Active Queue Management Algorithms", pp. 1–27, Mar. 1999.

Cisco's "Distributed Weighted Random Early Detection", Source=http://www.cisco.com/univercdcc/td/doc/product/software/ios111/cc111/wred.htm#xtocid236360, 17 pages, Feb. 9, 1998.

J. Wroclawski, MIT LCS "The Use of RSVP with IETF Integrated Services", RFC 2210, 31 pages, Sep. 1997.

Shenker, et al., "General Characterization Parameters for Integrated Service Network Elements", RFC 2215, 15 pages, Sep. 1997.

Braden, et al., "RAPI —An RSVP Application Programming Interface, Version 5", Internet Draft, 25 pages, Aug. 11, 1998.

Katsube, et al., "Toshiba's Router Architecture Extensions for ATM: OVerview", RFC 2098, 17 pages, Feb. 1997.

Rekhter, et al., "Cisco Systems' Tag Switching Architecture Overview", RFC 2105, 13 pages, Feb. 1997.

Viswanathan, et al., "ARIS: Aggregate Route–Based IP Switching", Internet draft, 19 pages, Mar. 1997.

Newman, et al., "Ipsilon Flow Management Protocol Specification for IPv4 Version 1.0", RFC 1953, 19 pages May 1996.

Davie, et al., "Switching in IP Networks", ISBN 1–558650–505–3, TK5105.875.157,D38, Morgan Kaufmann Publishers, Inc., San Francisco, CA, 8 pgs. cover, ISBN page, table of contents, pp. 27–55, 117–154, 219–232, 1998.

Moy, Proteon, Inc., "OSPF Version 2", RFC 1583, 202 pages, Mar. 1994.

Fuller, et al., "Classless Inter–Domain Routing (CIDR): An Address Assignment and Aggregation Strategy", RFC 1519, 23 pages, Sep. 1993.

Dumortier, "Toward a New IP over ATM Routing Paradigm",IEEE Communications Magazine, 2–page cover and pp. 82–86, Jan. 1998.

White, et al., "ATM Switching and IP Routing Integration: The Next Stage in Internet Evolution?", IEEE Communications Magazine, 2–page cover and pp. 79–83, Apr. 1998.

Viswanathan, et al., "Evolution of Multiprotocol Label Switching", IEEE Communications Magazine, 2–page cover and pp. 165–173, May 1998.

Laubach, "Classical IP and ARP over ATM", RFC 1577, 16 pages, Jan. 1993.

Callon, et al., "A Framework for Multiprotocol Label Switching", Internet–Draft, 65 pages, Nov. 1997.

Schmidt, et al., "Multiprotocol over ATM –Building State of the Art ATM Intranets", Manning Publications Co., ISBN 1–884777–42–2, TK5105.875.16S36, 8 pgs. cover, ISBN page, table of contents, and pp. 207–289, 1998.

Halabi, "Internet Routing Architecture ", Cisco Systems, New Riders, Cisco Press, 6 pgs. cover, ISBN page table of contents, and pp. 87–190, 1997.

Finn, et al., "LAN Emulation over ATM Version 2.0–LUNI Specification", The ATM Forum Technical Committee, AF–LANE–0084.000, 153 pages, Jul. 1997.

Alexander, et al., "Multi–Protocol over ATM Version 1.0", AF–MPOA–0087.000, The ATM Forum Technical Committee, 154 pages, Jul. 1997.

Deering, Stanford University, "Host Extension for IP Multicasting", STD 5, RFC 1112, 16 pages, Aug. 1989.

Sahinoglu, et al., "On Multimedia Networks: Self–Similar Traffic and Network Performance", IEEE Communications Magazine, vol. 37, No. 1, cover and pp. 48–52, Jan. 1999.

Fishburn, et al., "Dynamic Behavior of Differential Pricing and Quality of Service Options for the Internet", Proc. First Inter. Conf. on Information and Computation Economics (ICE–98), ACM Press, 1998, pp. 128–139, 1998.

Steinmetz, et al., "Multimedia: Comuting Communications and Applications", Prentice Hall, ISBN 0–13–324435–0, QA76.575.S73, cover, acknowledgment page, LOC page, Index (15 pgs) and pp. 420–450, 1995.

Gale, et al., "College Admissions and the Stability of Marriage", The American Mathematical Monthly, vol. 69, No. 1, cover and pp. 9–15, 1992.

McKeown, "Scheduling Algorithms for Input–Queued Cell Switches", Ph.D. Thesis, Univ. of California at Berkeley, UMI No. 9602658, 12 pages cover, introduction, acknowledgment and index pages, 119 pages text, 1995.

Simpson, Daydreamer, "PPP over SONET/SDH", RFC 1619, 6 pages, May 1994.

Simpson, Daydreamer, "Point–to–Point Protocol (PPP)", RFC 1661, 50 pages, Jul. 1994.

Simpson, Daydreamer, "PPP in HDLC–Like Framing", RFC 1662, 24 pages, Jul. 1994.

McCloghrie, et al., "Management Information Base for Network Management of TCP/IP–Based Internets:MIB–II", RFC 1213, 66 pages Mar. 26, 1991.

Baker, et al., Cisco Systems, "OSPF Version 2 Management Information Base", RFC 1850, 75 pages Nov. 1995.

Baker, et al., Cisco Systems, "RSVP Management Information Base Using SMIv2", RFC 2206, 60 pages, Sep. 1997.

Kastenholz, FTP Software, Inc., "The Definitions of Managed Objects for the Link Control Protocol of the Point–to–Point Protocol", RFC 1471, 24 pages, Jun. 1993.

Kastenholz, FTP Software, Inc., "The Definitions of Managed Objects for the IP Network Control Protocol of the Point–to–Point Protocol", RFC 1473, 10 pages Jun. 1993.

Baker, Cisco Systems, "IP Forwarding Table MIB", RFC 2096, 20 pages, Jan. 1997.

Awduche, et al., draft–ietf–tewg–framework–01.txt (IETF), "A Framework for Internet Traffic Engineering", 63 pages, Jul. 2000.

U.S. patent application Ser. No. 09/588,634, entitled "Method and System for Providing a Protection Path for Connection–Oriented Signals in a Telecommunications Network", inventors Mo, et al., 32 pages specification, claims and abstract and 3 pages of drawings (Attorney's Docket No. 064731.0141), Jun. 6, 2000.

U.S. patent application Ser. No. 09/589,038, entitled "Method and System for Providing a Protection Path for Connectionless Signals in a Telecommunications Network", inventors Mo, et al., 38 pages specification, claims and abstract and 9 pages of drawings (Attorney's Docket No. No. 064731.0142), Jun. 6, 2000.

U.S. patent application Ser. No. 09/588,806, entitled "Transport Network and Method", inventors Mo, et al., 40 pages specification, claims and abstract and 9 pages of drawings (Attorney's Docket No. 064731.0143), Jun. 6, 2000.

U.S. patent application Ser. No. 09/588,632, entitled "System and Method Connectionless/Connection Oriented Signal Transport", inventors Mo, et al., 44 pages specification, claims and abstract and 7 pages of drawings (Attorney's Docket No. 064731.0145) Jun. 6, 2000.

U.S. patent application Ser. No. 09/848,994, entitled "Method and System for Quality of Services (QoS) Support in a Packet–Switched Network", inventors Li Mo, et al., 35 pages specification, claims and abstract and 6 pages of drawings (Attorney's Docket No. 064731.0167), May 4, 2001.

U.S. patent application Ser. No. 09/848,871, entitled "Method and System for Modeling and Advertising Asymmetric Topology of a Node in a Transport Network", inventors Jaber, et al., 35 pages specification, claims and abstract and 10 pages of drawings (Attorney's Docket No. 064731.0169), May 4, 2001.

U.S. patent application Ser. No. 09/849,003, entitled "Unique Address Space and Method for a Transport Network", inventor Edwin Alton Harbin, 36 pages specification, claims and abstract and 10 pages of drawings (Attorney's Docket No. 064731.0170), May 4, 2001.

U.S. patent application Ser. No. 09/849,010, entitled "Method and System for Hardware Stimulation", inventors Richard L. Klevans, et al., 28 pages specification, claims and abstract and 7 pages of drawings (Attorney's Docket No. 064731.0171), May 4, 2001.

* cited by examiner

METHOD AND SYSTEM FOR TRANSPORTING TRAFFIC IN A PACKET-SWITCHED NETWORK

RELATED APPLICATIONS

This application claims the benefit of U.S. Provisional Application Serial No. 60/202,190, entitled INTERNET PROTOCOL TRANSPORT, filed May 5, 2000 which is hereby incorporated by reference.

TECHNICAL FIELD OF THE INVENTION

The present invention relates generally to the field of telecommunication networks, and more particularly to a method and system for transporting traffic in a packet-switched network.

BACKGROUND OF THE INVENTION

Telecommunication networks transport voice and data according to a variety of standards and using a variety of technologies. Circuit-switch networks such as plain old telephone service (POTS) utilize transmission paths dedicated to specific users for the duration of a call and employ continuous, fixed-bandwidth transmission. Packet-switch networks (PSNs) allow dynamic bandwidth, depending on the application, and can be divided into connectionless networks with no dedicated paths and connection-oriented networks with virtual circuits having dedicated bandwidth along a predetermined path. Because packet-switched networks allow traffic from multiple users to share communication links, these networks utilize available bandwidth more efficiently than circuit-switched networks.

Internet protocol (IP) networks are connectionless packet-switched networks. IP networks transport information by breaking up bitstreams into addressable digital packets. Each IP packet includes source and destination addresses and can take any available route between the source and the destination. The IP packets are transmitted independently and then reassembled in the correct sequence at the destination.

Conventional IP networks employ routers to direct packets to their destination. Packets are inspected at each router for network protocol addresses and forwarded to a next router on the way toward the destination based on down-stream congestion and other real-time parameters. While this inspection and dynamic routing provides a high degree of flexibility within the network, it adds delays to each packet at each router. Accordingly, traffic transported across an IP network between geographically distributed source and destination points will have a relatively large cumulative delay. This limits the ability of the IP network to support voice, video, and other real-time applications.

SUMMARY OF THE INVENTION

The present invention provides an improved method and system for transporting traffic in a packet-switched network that substantially eliminate or reduce the problems and disadvantages associated with previous systems and methods. In particular, the present invention provides a packet-switched network with high-speed links between geographically distributed nodes. The nodes are directionally-sensitive to direct traffic with minimal delays and support voice, video and other real-time applications.

In accordance with one embodiment of the present invention, a method and system for processing traffic in a network node includes segmenting high priority pass-through traffic from low priority pass-through traffic. The high priority pass-through traffic is transmitted on an egress link preferentially over the low priority pass-through traffic and ingress high priority local traffic. The ingress high priority local traffic is transmitted on the egress link preferentially over the low priority pass-through traffic.

More specifically, in accordance with a particular embodiment of the present invention, the traffic may comprise Internet Protocol (IP) packets. In this and other embodiments, the high priority traffic may be reserved bandwidth traffic and the local priority traffic may be reserved bandwidth traffic and the local priority may be unreserved bandwidth traffic. The high and low priority IP packets may be segmented based on their quality of service (QoS).

In accordance with another aspect of the present invention, a node for a telecommunications network includes a high-speed ingress link, a high-speed egress link and a local interface. A directionally-sensitive interface is coupled between the high-speed ingress link, the high-speed ingress link and the local interface. The directionally-sensitive interface is operable to receive an ingress traffic stream on the high-speed link, to segment high priority pass-through traffic from low priority pass-through traffic in the ingress traffic stream, to transmit on the high-speed ingress link the high priority pass-through traffic preferentially over the low priority pass-through traffic and ingress high priority local traffic received from the local interface, and to transmit on the egress link the ingress high priority local traffic preferentially over the low priority pass-through traffic.

In accordance with still another aspect of the present invention, a telecommunications network includes a plurality of nodes interconnected by links. A path is defined through the network between the a source node and the destination node. The path includes dedicated links from the source node through intermediate nodes to the destination node in directionally-sensitive interfaces at each intermediate node. The directionally-sensitive interfaces are each operable to segment high and low priority pass-through traffic and to transmit the high priority pass-through traffic on the path preferentially over the low priority pass-through traffic and the local traffic.

Technical advantages of the present invention include providing an improved packet-switched network. In particular, the packet-switched network provides high-speed links between directionally-sensitive network nodes. Fast paths are defined through the nodes to transport traffic with no substantial node delay. This allows queuing delays to be accurately estimated and increases bandwidth manageability for reserved traffic. In addition, the low-latency links allows voice, video, and other real-time traffic to be supported by the packet-switched network.

Another technical advantage of the present invention includes providing class of service (CoS) support for Internet protocol (IP) traffic. In particular, traffic is distinguished and routed based on its CoS parameters. This allows high-priority traffic to be processed with minimal delay across a number of nodes and low-priority traffic to be delayed or dropped to avoid down-stream starvation.

Still another technical advantage of the present invention includes providing an improved method and system for transporting traffic in a packet-switched network. In particular, all high priority or reserve traffic on a fast path is passed through a node using only shallow look-up while low priority or unreserved traffic is buffered to prevent node starvation. Local high priority reserve traffic is added to the egress traffic stream based on bandwidth availability. Local and pass-through low priority traffic is added based on remaining bandwidth availability.

Still another technical advantage of the present invention includes providing an improved IP node for processing traffic in an IP network. In particular, the node is an add-drop multiplexer (ADM) with directionally-sensitive traffic processing functionality that processes through traffic with substantially no node delay. In addition to reducing delay, the sense of direction reduces buffer speed and allows for more accurate connection admission control (CAC), which reduce cost of the node while improving operational efficiency.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
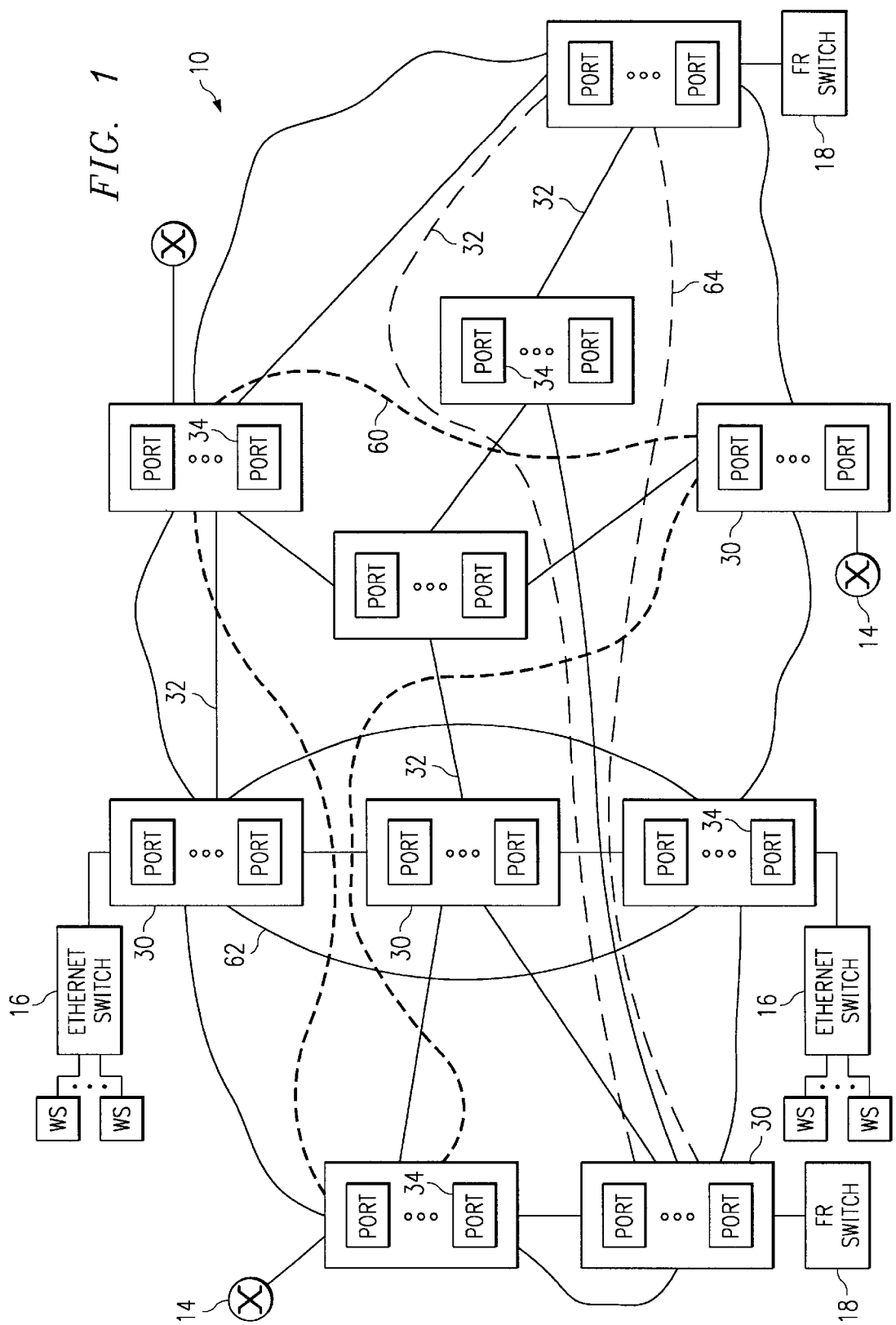
FIG. 1 is a block diagram illustrating a transport network in accordance with one embodiment of the present invention.

FIG. 1 illustrates a transport network 10 in accordance with one embodiment of the present invention. In this embodiment, the transport network 10 is an Internet protocol (IP) network for transporting IP and Multiple Protocol Label Switch (MPLS) packets. The transport network 10 may be any other packet-switched network operable to route, switch, and/or otherwise direct data packets based on network protocol addresses.

The transport network 10 is a private network connecting geographically distributed segments of an external network 12. The external network 12 includes one or more public and/or private networks such as the Internet, an intranet, and other suitable local area networks (LAN), wide area networks (WAN), and nodes. The external network 12 includes label switch and subtending routers 14, Ethernet switches 16, Frame Relay switches 18 and other suitable routers, switches, and nodes operable to generate and/or transport traffic. The transport network 10 communicates with nodes of the external network 12 in the native protocol of the nodes to communicate traffic and control signaling between the networks 10 and 12.

Referring to FIG. 1, the transport network 10 includes a plurality of Internet protocol transport (IPT) nodes 30 interconnected by communication links 32. The IPT nodes 30 each include a plurality of ports 34 accessible to the external network 12. As used herein, each means every one of at least a subset of the identified items. The communication links 32 are optical fiber or other suitable high-speed links. As described in more detail below, the high-speed links 32 connect high speed interfaces of the IPT nodes 30 to form fast transport segments (FTS) through the transport network 10. Packets transferred via the FTSs incur very small buffering delay in the network. Packets carried through the ports 34 and between FTSs may incur queuing delay comparable to a normal IP switch.

To optimize bandwidth usage within the transport network 10, packets may be transmitted directly on the high-speed optical links 32 without synchronous optical network (SONET) framing and its associated overhead which imposes a penalty of three to five percent depending on the line rate. In one embodiment, a transport label is added to each packet to generate an internal packet that can be directly transmitted on the optical links 32. Details of the transport label are described in co-owned U.S. Patent Application entitled "System and Method for Connectionless/Connection Oriented Signal Transport", filed Jun. 6, 2000. Using the transport label, both connection-oriented and connectionless traffic may be seamlessly transported across the transport network 10. Protection for connection oriented data flows may be provided as described in co-owned U.S. Patent Application entitled "Method and System For Providing A Protection Path For Connection-Oriented Signals In A Telecommunications Network", filed Jun. 6, 2000. Protection for connectionless traffic flows may be provided as described in co-owned U.S. Patent Application "Method and System For Providing A Protection Path For Connectionless Signals In A Telecommunications Network", filed Jun. 6, 2000.

To support voice, video, and other real-time or time-sensitive applications, the transport network 10 provides class of service (CoS) capabilities. In one embodiment, all IP packets are mapped to one of three priority levels as they enter the transport network 10. In this embodiment, guaranteed traffic has reserved bandwidth and is guaranteed to be transported within a defined time delay. Control flow traffic is also reserved and guaranteed, but the network 10 does not guarantee delivery time delay. Best effort traffic does not have reserved bandwidth and delivery is not guaranteed by the network 10. By distinguishing and prioritizing traffic based on its priority, including CoS and/or service level agreement (SLA), and/or other suitable indication of importance or delivery constraints, the transport network 10 is able to deliver time-sensitive traffic within tight time constraints by delaying and/or dropping best effort traffic and other low priority traffic.

In one embodiment, the transport network 10 utilizes a private internal addressing scheme to isolate the network 10 from customers and thus minimize or prevent conflicts with private and/or public networks connected to the transport network 10. This reduces the complexity of network management and preserves the topology of the existing routed network 12. In addition, transport network isolation enables value added services to be provided through the transport network 10.

When an independent addressing scheme is utilized for the transport network 10, egress traffic is converted from the external addressing scheme to the internal addressing scheme at ports 34 using standardized or extended network address translation (NAT). Similarly, egress traffic is converted from the internal addressing scheme back to the external addressing scheme at ports 34 using standard or extended NAT. In addition to the internal addresses, each IPT node 30, port 34 and other component of the transport network 10 visible to the external network 12 includes a globally unique IP address. These addresses are used for external management of the transport network 10.

The transport network 10 provides a flexible topology in which sets of ports 34 may be grouped in any suitable way and each treated as a single entity capable of independently interacting with external nodes. Thus, the transport network 10 is externally represented as sets of port groups 50 with internally managed connectivity. Provisioning of port groups 50 in the transport network 10 is unconstrained with mesh and partial-mesh topologies supported.

The port groups 50 are each a set of ports 34 with similar routing properties. In particular, a port group 50 is a set of ports 34 configured to provide multipoint-to-multipoint or at least point-to-multipoint connectivity between each other which allows point-to-multipoint connectivity between external elements. Accordingly, traffic received by a port group 50 can be routed directly from an ingress port 34 to a plurality of egress ports 34 without channelization in the transport network 10.

Port groups 50 may be provisioned as simple port groups and as composite port groups. In the simple port group configuration, each port 34 only belongs to a single port group 50. Private addresses can be supported inside the simple port group configuration. A composite port group includes ports 34 which have membership in multiple port groups 50. In the composite port group case, private IP addressing is not supported.

The port groups 50 each define a transport element 52 with geographically distributed ports 34. Each transport element 52 is assigned a unique global IP address for peering and protocol exchanges within and/or external to the transport network 10. As described in more detail below, the transport elements 52 may implement a distributed architecture in which local processors control each of the ports 34 and a centralized processor controls the network element 52.

In particular embodiments, the transport elements may be transport routers 60 interconnecting sets of subtending IP routers 14, transport Ethernet switches 62 interconnecting sets of subtending Ethernet switches 16, and transport Frame Relay switches 64 interconnecting sets of subtending Frame Relay switches 18. In addition, the transport element 52 may interconnect two ports transparently, in which case the port group 50 is user protocol independent.

Figure 2:
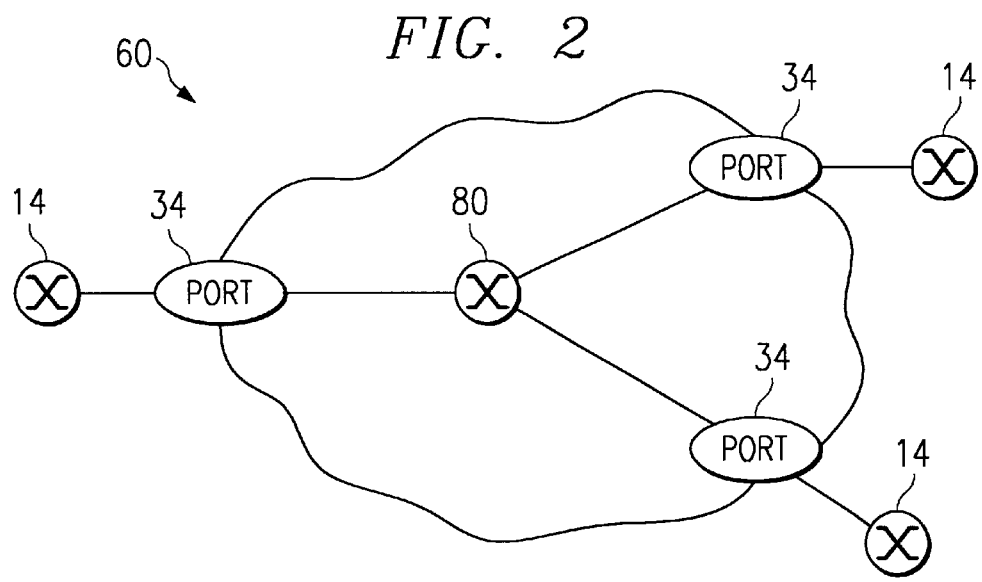
FIG. 2 is a block diagram illustrating an external representation for the transport router of FIG. 1 in accordance with one embodiment of the present invention.

FIG. 2 illustrates details of the transport router 60 in accordance with one embodiment of the present invention. In this embodiment, the transport router 60 comprises a simple port group and acts as a single network element within a customer's autonomous network.

Referring to FIG. 2, the transport router 60 includes geographically distributed ports 34 connected to external routers 14. The external ports 34 form a port group 50 with point-to-multipoint connectivity between the ports 34 as externally represented by the router 80. Accordingly, traffic from any one of the external routers 14 may be routed from an ingress port 34 directly to any number of the other external routers 14 by router 80.

The transport router 60 includes a router identifier to peer with the external routers 14 and participate in reservation and other protocol exchanges. In a particular embodiment, the transport router 60 peers with subtending routers 14 by using interior gateway protocols (IGP) such as OSPF, IS-IS, or RIP. The transport router 60 may peer using an exterior gateway protocol (EGP) or any other suitable protocol.

Figure 3:
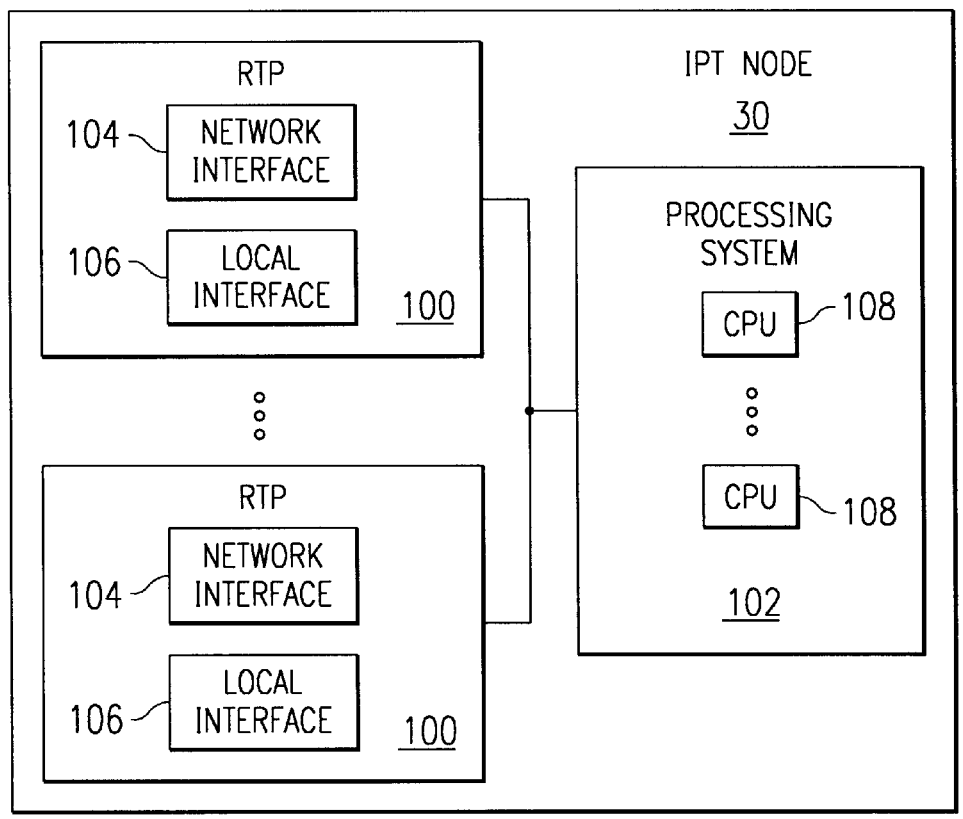
FIG. 3 is a block diagram illustrating details of the Internet protocol transport (IPT) node of FIG. 1 in accordance with one embodiment of the present invention.

FIG. 3 illustrates details of the IPT node 30 in accordance with one embodiment of the present invention. In this embodiment, the IPT node 30 comprises an add/drop multiplexer (ADM) with modular building blocks to support a scalable, pay-as-you-grow architecture. Accordingly, the transport network 10 owner may add functionality and incur cost based on customer demand.

Referring to FIG. 3, the IPT node 30 includes one or more receiver-transceiver pairs (RTP) 100 and a processing system 102 interconnected by an internal Ethernet connection. As described in more detail below, each RTP 100 includes one or more internal interfaces 104 and one or more local interfaces 106. The internal interfaces are high-speed interfaces between the IPT nodes 30 while the local interfaces 106 are low-speed ports 34 accessible to external nodes and/or interfaces between FTSs.

Within the transport network 10, a set of internal interfaces 104 of the IPT nodes 30 are connected together between ports 34 of a port group 50 to form an FTS between the ports 34 and provide multipoint-to-multipoint and/or point-to-multipoint connectivity. In particular, a multiplexer of an internal interface 104 is connected to a demultiplexer of a next internal interface 104 in the FTS while a demultiplexer of the internal interface 104 is connected to a multiplexer of a previous internal interface 104 in the FTS. The FTSs are directionally-sensitive to preferentially route pass-through traffic over local ingress traffic. In this way, traffic for a transport element 52 is transported between an ingress and an egress port on an FTS to minimize delay within the transport network 10.

The processing system 102 includes one or more central processing units (CPUs) 108. The CPUs 108 may each operate the IPT node 30 or a transport element 52. A CPU 108 operating the IPT node 30 includes an operating system and control functionality for the IPT node 30. A CPU 108 operating a transport element 52 includes control functionality for the distributed components of the transport element 52.

Figure 4:
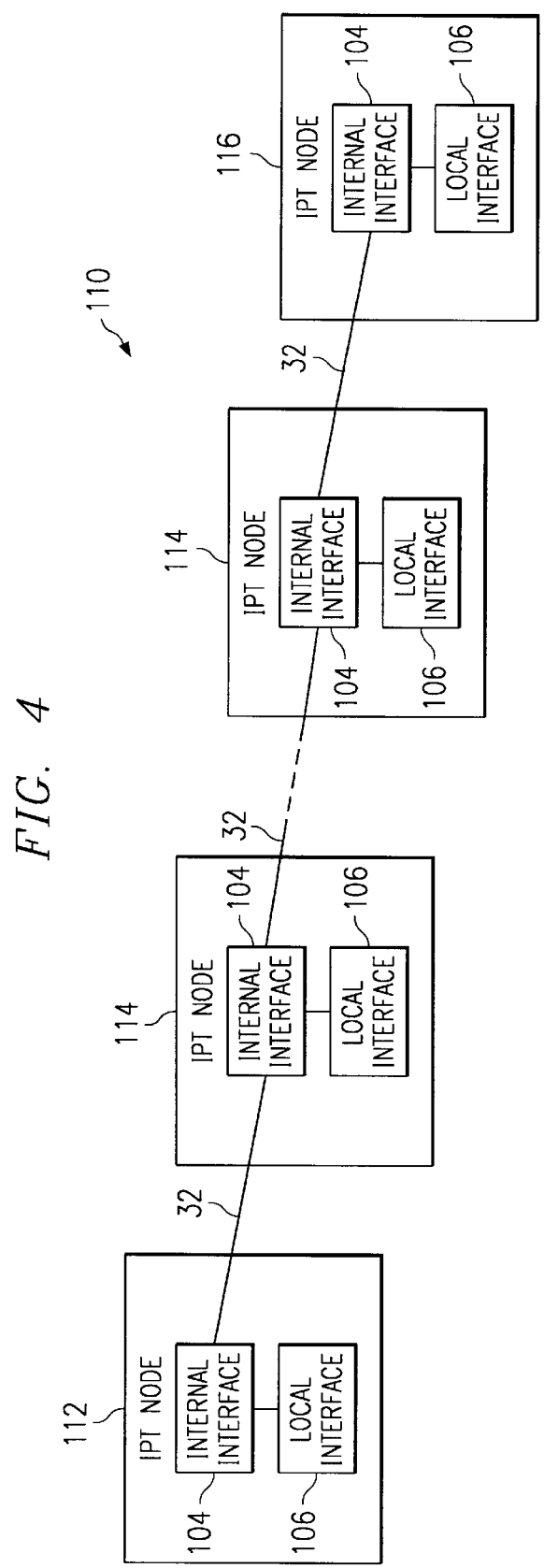
FIG. 4 is a block diagram illustrating a fast transport segment (FTS) defined through the transport network of FIG. 1 in accordance with one embodiment of the present invention.

FIG. 4 illustrates a FTS 110 in accordance with one embodiment of the present invention. In this embodiment, the FTS 110 comprises 10 Gb/s links and directionally-sensitive interfaces to provide a cumulative delay of less than 2.5 microseconds for a 1,500 bite maximum packet size. It will be understood that the FTS 110 may comprise other high-speed links and interfaces. A high-speed link is operable to transport traffic at a rate of 5 Gb/s or greater. Preferably, the high-speed links transport traffic at rates of 10 Gb/s or above.

Referring to FIG. 4, the FTS 110 comprises dedicated internal interfaces 104 and high-speed links 32 extending from a source node 112 through a plurality of intermediate nodes 114 to a destination node 116. A local interface 106 is coupled to each of the internal interfaces 104 to allow local traffic to be added and dropped from the FTS 110.

As described in more detail below, in the FTS 110, each internal interface 104 segments local and pass-through traffic. The local traffic is dropped. The pass-through traffic is segmented into high and low priority pass-through traffic. The high priority pass-through traffic is transmitted along the FTS 110 preferentially over the low priority pass-through traffic and local ingress traffic from the local interface 106. The low priority pass-through is buffered. A traffic class is transmitted preferentially over other traffic when it is transferred first using needed bandwidths, the other traffic using remaining bandwidth for transmission.

The local traffic is segmented into high priority local traffic and low priority local traffic. The high priority local traffic is transmitted preferentially over the low priority pass-through traffic and the low priority local traffic. Accordingly, high priority pass-through traffic is transmitted without or with only minimum delay while avoiding starvation at the intermediate nodes 114.

The low priority traffic is transmitted based on remaining bandwidth availability. In one embodiment, the low priority pass-through traffic is transmitted preferentially over the low priority local traffic to give preference to pass-through traffic at all priorities. The high priority traffic may be reserve bandwidth traffic and the low priority traffic unreserved bandwidth traffic. Additional and intermediate priorities of traffic may be identified, segmented, and used to preferentially route traffic in the network.

In a particular embodiment, local and pass-through traffic is distinguished and segmented based on a shallow IP layer 2/3 lookup using the transport label. In this embodiment, the transport label identifies each packet as local or remote (pass-through). Local traffic is dropped while the priority of the pass-through traffic is determined based on QoS for immediate transmission out or buffering. Similarly, ingress local traffic is analyzed to determine its transmission priority. Traffic having the same priority is transmitted in a first-in/first-out (FIFO) basis.

Figure 5:
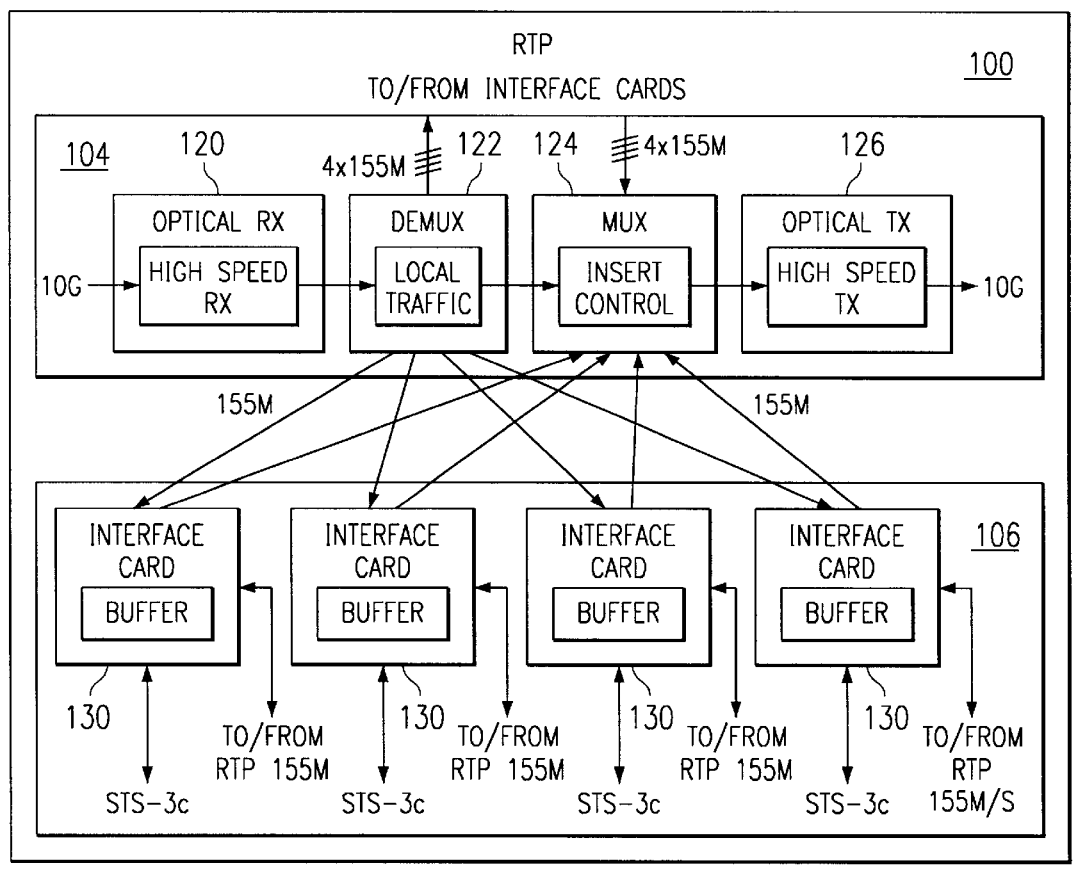
FIG. 5 is a block diagram illustrating details of the receiver-transmitter pair (RTP) of FIG. 3 in accordance with one embodiment of the present invention.

FIG. 5 illustrates details of the RTP 100 in accordance with one embodiment of the present invention. In this embodiment, the internal interface 104 is a high-speed interface that operates at substantially 10 Gb/s. The external interface 106 is a low-speed packet over SONET (POS) interface that operates at 2.5 Gb/s or below.

Referring to FIG. 5, the internal interface 104 includes an optical receiver 120, a demultiplexer 122, a multiplexer 124, and an optical transmitter 126. The optical receiver is a 10 Gb/s receiver without SONET or package level knowledge. The optical receiver 120 performs the optical to electrical signal conversion. The optical receiver 120 may include an amplifier and may directly interface with a wave division multiplex (WDM) system.

The demultiplexer 122 drops local traffic and inter RTP traffic as well as buffers transit traffic. In a particular embodiment, the demultiplexer 122 has a set of 155 Mb/s connections to interface cards of the external interface 106. The demultiplexer 122 may also have 155 Mb/s connections to interface cards of other RTPs 100.

The multiplexer 124 collects local traffic from the interface cards of the external interface 106 and through traffic from the.demultiplexer 122. The multiplexer 124 includes packet buffer, scheduler and insertion control functionality.

The optical transmitter 126 is a 10 Gb/s transmitter without SONET or package level knowledge. The optical transmitter 126 may include an optical amplifier. The optical transmitter 126 performs a conversion from an electrical signal to an optical signal and may interface directly with a WDM system.

The local interface 106 include a plurality of low-speed interface cards 130. The low-speed interface cards 130 send and receive traffic to and from the multiplexer 124 and demultiplexer 122, respectively. The low-speed interface cards 130 also provide connections between the FTSs.

The low-speed interface cards 130 are the main buffering point for ingress and egress traffic of the transport network 10. Packet level intelligence, including routing and protection mechanisms, are provided by the low-speed interface cards 130. If the transport network 10 uses an isolated addressing scheme, the low-speed interface cards 130 perform NAT functionality.

Figure 6:
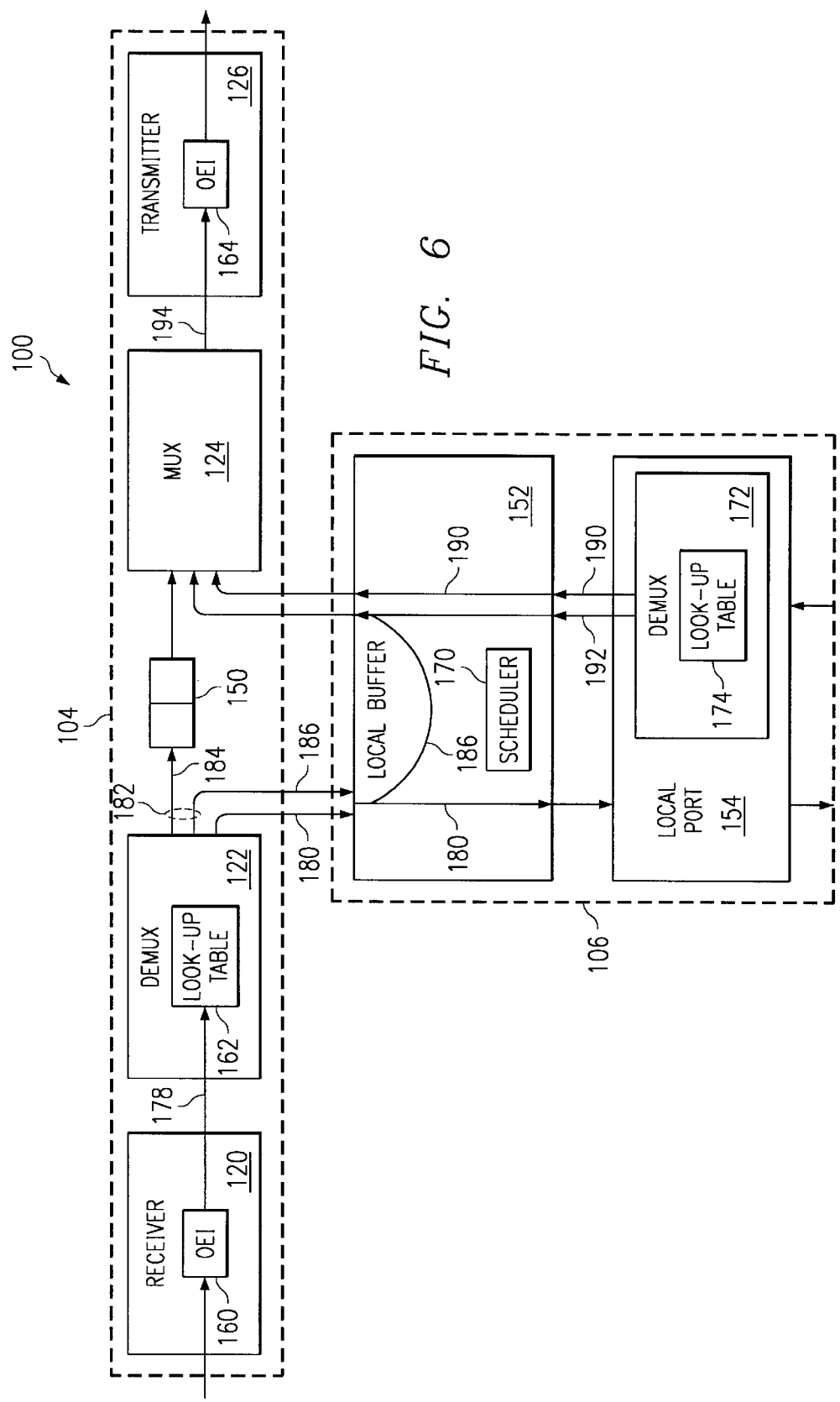
FIG. 6 is a block diagram illustrating traffic flow through the RTP of FIG. 5 in accordance with one embodiment of the present invention.

FIG. 6 illustrates traffic flows through the RTP 100 in accordance with one embodiment of the present invention. In this embodiment, traffic is distinguished, segregated, and processed based on a two level, low/high priority scheme. It will be understood that the traffic flows may be segmented into any number of suitable traffic types based on CoS, QoS and other suitable traffic type identifiers.

Referring to FIG. 6, the RTP 100 includes internal interface 104 and local interface 106. The internal interface 104 includes the receiver 120, demultiplexer 122, multiplexer 124 and transmitter 126. A traffic buffer 150 is coupled between the demultiplexer 122 and multiplexer 124. The local interface 106 includes a local buffer 152 coupled between the demultiplexer 122, multiplexer 124 and a local port 154.

The receiver 120 includes an optical to electrical interface (OEI) 160 for converting ingress optical signals from the high-speed optical links 32 to electrical signals. The demultiplexer 122 includes a lookup table 162 for identifying pass-through and local traffic. The transmitter 126 includes an OEI 164 for converting an egress traffic stream to optical signals for transmission over the high-speed optical links 32. The transmit buffer 150 is a two packet or other suitable sized buffer operable to hold direct pass-through packets while the multiplexer 124 completes processing of a current packet.

The local buffer 152 receives low priority pass-through traffic and buffers the traffic for transmission based on bandwidth availability. Egress local traffic is dropped through the local buffer 152 to the local port 154 for transmission to a local designation or another FTS 110. The local buffer 152 also receives and buffers ingress high and low priority local traffic for transmission on the FTS 110 based on bandwidth availability. Local buffer 152 may include a scheduler 170 to shape low priority pass-through and local traffic.

The local port 152 receives and transmits local traffic. In one embodiment, the local port 152 includes a demultiplexer 172 with lookup table 174 for distinguishing and segmenting high and low priority ingress local traffic. This allows all high priority traffic to be transmitted preferentially over all low priority traffic regardless of the source and/or the destination of the traffic.

In operation, an ingress traffic stream is received at the receiver 120 and converted to an electrical packet stream 178 by OEI 160. The packet stream 178 is demultiplexed by demultiplexer 122 into discrete packets and segmented into local egress traffic 180 and pass-through traffic 182. The pass-through traffic 182 is further segmented based on its QoS into high priority pass-through traffic 184 and low priority pass-through traffic 186.

The high priority pass-through traffic 186 is passed to the multiplexer 124 through the transmit buffer 150 while the low priority pass-through traffic 186 is dropped to the local buffer 152. The local buffer 152 drops egress local traffic 180 and hairpins low priority pass-through traffic 186 for transmission back on the FTS 110 based on bandwidth availability.

Local ingress traffic is demultiplexed at the local port 154 and segmented into high priority local ingress traffic 190 and low priority local ingress traffic 192 using the lookup table 174. The local buffer 154 receives and buffers the high and low priority local traffic 190 and 192 along with the low-priority pass-through traffic 186.

The multiplexer 124 inserts all high-priority pass-through traffic from the transmit buffer 150 into an egress traffic flow 194 immediately or, if active, immediately upon finishing a current packet. High priority local traffic 190 is inserted into available bandwidth with the low priority pass-through local traffic inserted into the remaining available bandwidth of the egress traffic flow and with the low priority pass-through and local traffic inserted into the remaining available bandwidth. The multiplexer 124 multiplexes the traffic flows into an egress traffic stream 194 that is converted to an optical signal by OEI 164 for transmission over the high speed optical link 32. In this way, high priority pass-through traffic passes the RTP 100 with little or no delay. Local high priority traffic is delayed transmission on the FTS 110 until bandwidth first becomes available. After that point, it is treated as pass-through traffic by downstream nodes to prevent additional delays. Accordingly, queuing delays can be estimated and are minimized in the network, which increases bandwidth manageability and applications that can be supported by the network.

Figure 7:
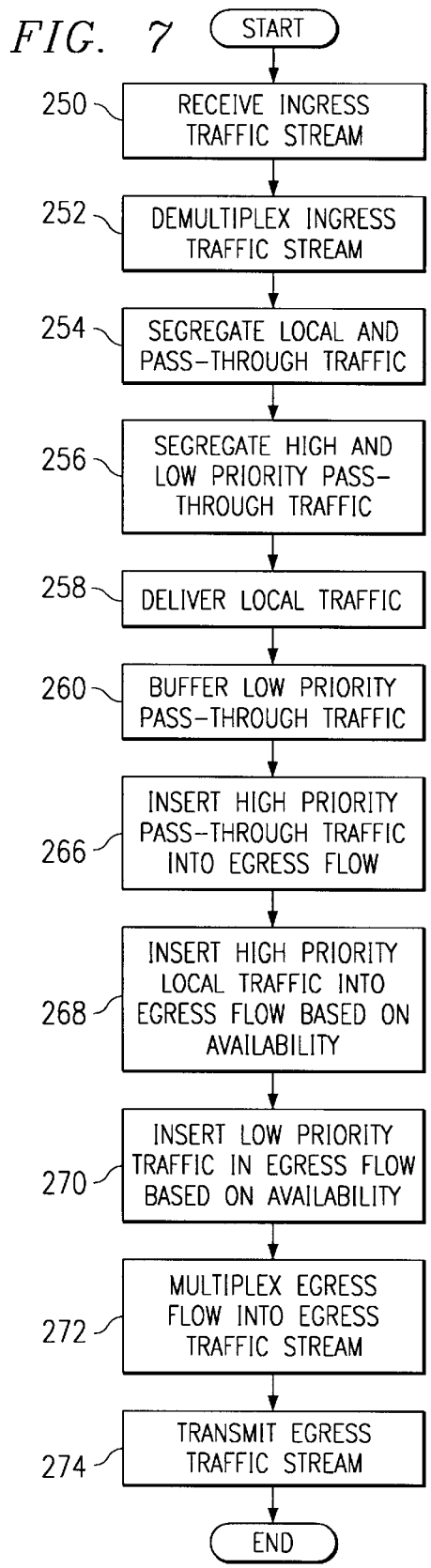
FIG. 7 is a flow diagram illustrating a method for processing traffic for low-latency transport through the transport network of FIG. 1 in accordance with one embodiment of the present invention.

FIG. 7 is a flow diagram illustrating a method for processing traffic in a node for low latency transmission across the transport network 10. The method begins at step 250 in which an ingress traffic stream is received. At step 252, the ingress traffic stream is demultiplexed into individual IP packets.

Proceeding to step 254, local and pass-through traffic is segregated. The traffic may be segregated using the transport label and a shallow lookup or a standard routing table lookup. At step 256, high and low priority pass-through traffic is segregated. In one embodiment, guaranteed and control signal traffic using reserve bandwidth are treated as high priority traffic while best effort traffic using unreserved bandwidth is treated as low priority traffic.

Proceeding to step 258, local egress traffic is dropped. At step 260, low priority pass-through traffic is buffered. At step 266, high priority pass-through traffic is inserted into the egress flow for immediate transmission regardless of the amount of local traffic waiting transmission. At step 268, high priority local traffic is inserted into the egress flow based on bandwidth availability. Thus, all high-priority traffic is transmitted before low priority traffic is processed regardless of the source or destination of the low priority traffic.

Next, at step 270, the low priority traffic is inserted into the egress traffic flow based on remaining bandwidth availability. The low priority traffic may be inserted in a FIFO order or preferentially with pass-through traffic transmitted prior to local traffic. At step 272, the egress flows are multiplexed into an egress traffic stream. The egress traffic stream is transmitted on the FTS 110 at step 274. In this way, substantial cumulative delays are avoided in the network.

Although the present invention has been described with several embodiments, various changes and modifications may be suggested to one skilled in the art. It is intended that the present invention encompass such changes and modifications as fall within the scope of the appended claims.

What is claimed is:

1. A method for processing traffic in a network node, comprising:
    determining whether the traffic is pass-through traffic or local traffic and whether the traffic is high priority or low priority;
    segmenting high priority pass-through traffic from low priority pass-through traffic;
    transmitting on an egress link the high priority pass-through traffic preferentially over the low priority pass-through traffic and high priority local traffic; and
    transmitting on the egress link the high priority local traffic preferentially over the low priority pass-through traffic.

2. The method of claim 1, further comprising:
    segmenting the high priority local traffic from low priority local traffic; and
    transmitting on the egress link the high priority local traffic preferentially over the low priority pass-through traffic and the low priority local traffic.

3. The method of claim 2, wherein the low priority traffic is best effort traffic.

4. The method of claim 1, further comprising receiving the high and low priority pass-through traffic on an ingress link, the ingress and egress links forming part of a dedicated path through the network.

5. The method of claim 4, wherein the ingress and egress links comprise high-speed links.

6. The method of claim 5, wherein the high-speed links comprise substantially 10 Gb/s links.

7. The method of claim 1, further comprising:
    receiving an ingress traffic stream including the high and low priority pass-through traffic and local traffic; and
    delivering the local traffic.

8. The method of claim 7, wherein the traffic comprises Internet Protocol (IP) packets, further comprising:
    performing a shallow look-up for each IP packet; and
    segmenting the IP packets based on results of the shallow look-up.

9. The method of claim 1, wherein high priority traffic is reserved bandwidth traffic and low priority traffic is unreserved bandwidth traffic.

10. The method of claim 1, wherein the traffic comprises Internet Protocol (IP) packets.

11. The method of claim 9, further comprising segmenting high and low priority IP packets based on their quality of service (QoS).

12. The method of claim 1, further comprising segmenting the high and low priority pass-through traffic using an add/drop multiplexer (ADM).

13. The method of claim 1, further comprising delaying high priority pass-through traffic less than 2.5 microseconds in the node.

14. The method of claim 1, further comprising buffering low priority pass-through traffic.

15. The method of claim 1, wherein the traffic comprises Internet Protocol (IP) packets, further comprising only buffering high priority pass-through packets in response to active transmission of another packet and only for the duration of the transmission.

16. A node for a telecommunications network, comprising:
    a high-speed ingress link;
    a high-speed egress link;
    a local interface; and a directionally-sensitive interface coupled between the high-speed ingress link, the high-speed egress link and the local interface, the directionally-sensitive interface operable to:
receive an ingress traffic stream on the high-speed ingress link;
determine whether traffic is pass-through traffic or local traffic;
segment high priority pass-through traffic from low priority pass-through traffic in the ingress traffic stream;
transmit on the high-speed egress link the high priority pass-through traffic preferentially over the low priority pass-through traffic and high priority local traffic received from the local interface; and
transmit on the egress link the high priority local traffic preferentially over the low priority pass-through traffic.

17. The node of claim 16, the directionally-sensitive interface further operable to segment the high priority local traffic from low priority local traffic received from the local interface and to transmit on the egress link the high priority local traffic preferentially over the low priority pass-through traffic and the low priority local traffic.

18. The node of claim 17, the directionally-sensitive interface further operable to transmit on the egress link the low priority pass-through traffic and the low priority local traffic in a first-in, first out order.

19. The node of claim 16, wherein the high-speed ingress and the egress links comprise substantially 10 Gb/s links.

20. The node of claim 16, wherein the high priority traffic comprises reserved bandwidth traffic and the low priority traffic comprises unreserved bandwidth traffic.

21. The node of claim 16, wherein the traffic comprises Internet Protocol (IP) packets.

22. The node of claim 21, the directionally-sensitive interface further operable to segment the IP packets based on their quality of service (QoS).

23. The node of claim 16, the directionally-sensitive interface further operable to receive an ingress traffic stream including the high and low priority pass-through traffic and local traffic and to deliver the local traffic.

24. The node of claim 23, wherein the traffic comprises Internet Protocol (IP) packets, the directionally-sensitive interface further operable to perform a shallow lookup for each IP packet and to segment local and pass-through traffic based on results of the shallow lookup.

25. The node of claim 16, the directionally-sensitive interface further comprising an add/drop multiplex (ADM) operable to segment the high and low priority pass-through traffic.

26. The node of claim 16, further comprising:
a local buffer operable to buffer the low priority pass-through traffic and the high priority local traffic; and
a transmit buffer operable to buffer the high priority pass-through packets in response to active transmission of another IP packet and only for the duration of the transmission.

27. A telecommunications network, comprising:
a plurality of nodes interconnected by links;
a path defined through the network between a source node and a destination node, the path including dedicated links from the source node through intermediate nodes to the destination node and directionally-sensitive interfaces at each intermediate node;
the directionally-sensitive interfaces each operable to:
determine if traffic is pass-through traffic or local traffic;
segment high and low priority pass-through traffic; and
transmit the high priority pass-through traffic on the path preferentially over the low priority pass-through traffic and high priority local traffic transmitting on the egress link the high priority local traffic preferentially over the low priority pass-through traffic.

28. The telecommunications network of claim 27, each directionally-sensitive interface comprising an add/drop multiplexer (ADM) operable to segment the high and low priority pass-through traffic.

29. The telecommunications network of claim 27, wherein the traffic comprises Internet Protocol (IP) packets.

30. The telecommunications network of claim 27, wherein the high priority traffic comprises reserved bandwidth traffic and the low priority traffic comprises unreserved bandwidth traffic.

31. The telecommunications network of claim 27, wherein the links are substantially 10 Gb/s links.

32. The telecommunications network of claim 31, wherein the path comprises at least 10 intermediate nodes and traffic transmitted from the source node to the destination node is delayed less than 10 microseconds.

33. The telecommunications network of claim 32, wherein the traffic transported from the source node to the destination node is delayed less than 2.5 microseconds.

34. The telecommunications network of claim 32, wherein the path comprises at least 50 intermediate nodes.

* * * * *

UNITED STATES PATENT AND TRADEMARK OFFICE
CERTIFICATE OF CORRECTION

PATENT NO. : 6,693,909 B1
DATED : February 17, 2004
INVENTOR(S) : Li Mo et al.

It is certified that error appears in the above-identified patent and that said Letters Patent is hereby corrected as shown below:

Title page,
Item [56], References Cited, OTHER PUBLICATIONS, "Davie et al." reference, after ".875" delete "157" and insert -- I15 --.
"U.S. Patent Application Ser. No. 09/849,010", reference, after "Hardware", delete "Stimulation" and insert -- Simulation --.

Signed and Sealed this

Third Day of August, 2004

JON W. DUDAS
*Acting Director of the United States Patent and Trademark Office*